United States Patent
Luo et al.

(10) Patent No.: US 11,220,944 B2
(45) Date of Patent: Jan. 11, 2022

(54) RECOVERING DEACTIVATED METAL/ZEOLITE CATALYSTS

(71) Applicant: CUMMINS INC., Columbus, IN (US)

(72) Inventors: Jinyong Luo, Columbus, IN (US); Ashok Kumar, Columbus, IN (US); Krishna Kamasamudram, Columbus, IN (US); Neal W. Currier, Columbus, IN (US); Aleksey Yezerets, Columbus, IN (US); Yadan Tang, Columbus, IN (US); Michael J. Cunningham, Greenwood, IN (US); Di Wang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 797 days.

(21) Appl. No.: 16/062,266

(22) PCT Filed: Dec. 27, 2016

(86) PCT No.: PCT/US2016/068672
§ 371 (c)(1),
(2) Date: Jun. 14, 2018

(87) PCT Pub. No.: WO2017/117103
PCT Pub. Date: Jul. 6, 2017

(65) Prior Publication Data
US 2018/0363528 A1 Dec. 20, 2018

Related U.S. Application Data

(60) Provisional application No. 62/272,998, filed on Dec. 30, 2015.

(51) Int. Cl.
*F01N 3/20* (2006.01)
*F01N 11/00* (2006.01)
(Continued)

(52) U.S. Cl.
CPC ............ *F01N 3/208* (2013.01); *B01J 29/06* (2013.01); *B01J 29/90* (2013.01); *B01J 38/52* (2013.01);
(Continued)

(58) Field of Classification Search
CPC combination set(s) only.
See application file for complete search history.

(56) References Cited

U.S. PATENT DOCUMENTS 5,924,280 A * 7/1999 Tarabulski ......... B01D 53/9495
60/274
6,232,254 B1 5/2001 Schneider et al.
(Continued)

FOREIGN PATENT DOCUMENTS

EP 0 285 715 10/1988
WO WO-2012/151009 11/2012

OTHER PUBLICATIONS

International Search Report from corresponding PCT Application No. PCT/US2016/068672, dated Mar. 13, 2017, pp. 1-2.
(Continued)

*Primary Examiner* — Binh Q Tran
(74) *Attorney, Agent, or Firm* — Foley & Lardner LLP (57) ABSTRACT

A method of recovering selective catalytic reduction catalysts relates to metal-Zeolite based catalysts. A selective catalytic reduction catalyst service event where a metal-Zeolite based selective catalytic reduction catalyst of an
(Continued)

exhaust aftertreatment system may perform below a threshold level of performance is determined. The selective catalytic reduction catalyst then exposed to a recovery fluid selected to facilitate movement of metal ions.

19 Claims, 4 Drawing Sheets

(51) Int. Cl.
*B01J 29/06* (2006.01)
*B01J 38/60* (2006.01)
*B01J 29/90* (2006.01)
*B01J 38/52* (2006.01)
*B01J 38/62* (2006.01)

(52) U.S. Cl.
CPC .............. *B01J 38/60* (2013.01); *B01J 38/62* (2013.01); *F01N 3/2006* (2013.01); *F01N 3/2066* (2013.01); *F01N 11/00* (2013.01); *F01N 2260/04* (2013.01); *F01N 2370/04* (2013.01); *F01N 2450/30* (2013.01); *F01N 2550/02* (2013.01); *F01N 2610/02* (2013.01); *F01N 2610/06* (2013.01); *Y02A 50/20* (2018.01); *Y02T 10/12* (2013.01); *Y02T 10/40* (2013.01)

(56) References Cited

U.S. PATENT DOCUMENTS

| | | | |
|---|---|---|---|
| 6,395,664 | B1 | 5/2002 | Boehner et al. |
| 7,943,097 | B2* | 5/2011 | Golden .................. B01J 23/002 |
| | | | 422/180 |
| 8,187,388 | B2 | 5/2012 | Blohm |
| 8,281,572 | B2* | 10/2012 | Chi .......................... F01N 11/00 |
| | | | 60/286 |
| 8,389,431 | B2 | 3/2013 | Hoffmann et al. |
| 8,888,921 | B2 | 11/2014 | Servaas et al. |
| 9,080,524 | B2 | 7/2015 | Yezerets et al. |
| 9,732,687 | B2* | 8/2017 | Li ....................... B01D 53/9422 |
| 10,914,214 | B2* | 2/2021 | Price .................... B01J 35/0006 |
| 2009/0104096 | A1* | 4/2009 | Patchett ............. B01D 53/9436 |
| | | | 423/213.5 |
| 2014/0190150 | A1* | 7/2014 | Sakurai ................... F01N 3/085 |
| | | | 60/286 |
| 2015/0101310 | A1* | 4/2015 | Kowalkowski ......... F01N 3/208 |
| | | | 60/274 |

OTHER PUBLICATIONS

Written Opinion from corresponding PCT Application No. PCT/US2016/068672, dated Mar. 13, 2017, pp. 1-5.

* cited by examiner

RECOVERING DEACTIVATED METAL/ZEOLITE CATALYSTS

CROSS-REFERENCE TO RELATED APPLICATIONS

This application is the U.S. national phase of PCT No. PCT/US2016/068672, filed Dec. 27, 2016, which claims the benefit of and priority to U.S. Provisional Patent Application No. 62/272,998, filed on Dec. 30, 2015, the contents of which are incorporated herein by reference in their entirety.

TECHNICAL FIELD

The present disclosure relates generally to the field of exhaust aftertreatment systems.

BACKGROUND

In general, regulated emissions for internal combustion engines include carbon monoxide (CO), hydrocarbons, nitrogen oxides (NOx) and particulates. Such regulations have become more stringent over recent years. For example, the regulated emissions of $NO_x$ and particulates from diesel-powered engines are low enough that, in many cases, the emissions levels cannot be met with improved combustion technologies alone. To that end, exhaust aftertreatment systems are utilized to supplement improved combustion technologies to reduce the levels of harmful exhaust emissions present in exhaust gas.

Such aftermarket treatments often incorporate temperature-dependent chemical reactions incorporating selective catalytic reduction (SCR) catalysts to reduce regulated emissions. Metal-Zeolite based materials (e.g., Cu-Zeolites, including Si—Al—P—O based materials, Fe-Zeolites, etc.) are highly efficient and widely used SCR catalysts for NOx reduction from engine exhaust. However, these catalysts are susceptible to deactivation over time, for example due to hydrothermal aging. Deactivated SCR catalysts are commonly replaced with new SCR catalysts, which can be an expensive service event.

SUMMARY

Various embodiments relate to a method of recovering inactivated metal-Zeolite based selective catalytic reduction catalysts. The method includes determining a selective catalytic reduction catalyst service event where a metal-Zeolite based selective catalytic reduction catalyst of an exhaust aftertreatment system is at risk of underperformance (i.e., the system performs or may perform below a threshold level of performance). The method further includes exposing the selective catalytic reduction catalyst to a recovery fluid selected to facilitate movement of metal ions.

Further various embodiments relate to an exhaust aftertreatment system. The exhaust aftertreatment system includes a selective catalytic reduction (SCR) component. The SCR component is configured to recover inactivated metal-Zeolite based SCR catalysts by determining a SCR catalyst service event where a metal-Zeolite based SCR catalyst of an exhaust aftertreatment system is at risk of underperformance (i.e., the system performs or may perform below a threshold level of performance), and exposing the SCR catalyst to a recovery fluid selected to facilitate movement of metal ions.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Following below are more detailed descriptions of various concepts related to, and embodiments of, recovering inactivated SCR catalysts in vehicle exhaust aftertreatment systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
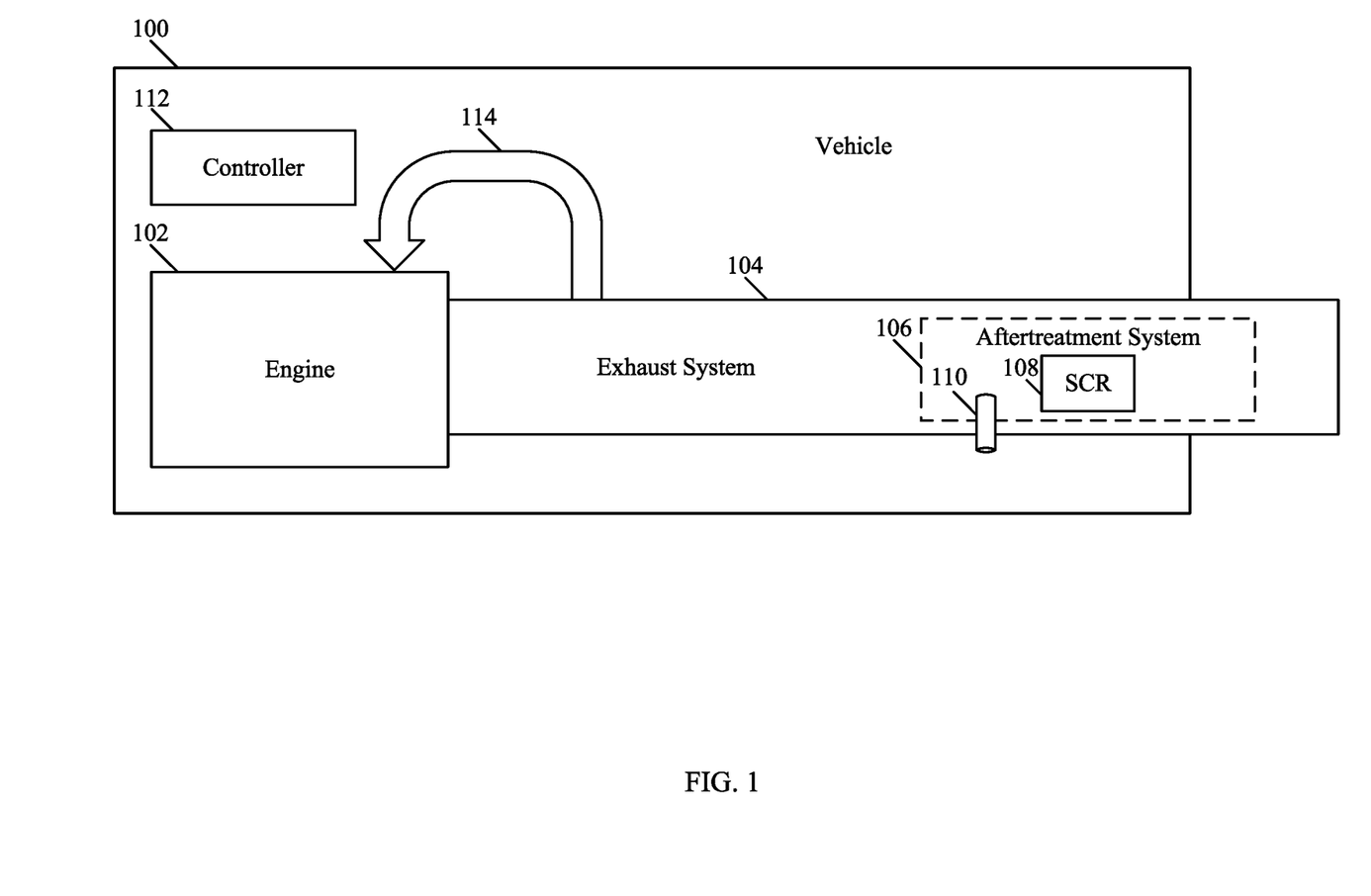
FIG. 1 is a schematic diagram of a vehicle with an internal combustion engine, according to an example embodiment.

FIG. 1 is a representation of an apparatus, for example a vehicle 100, including an engine 102, an exhaust system 104, and a controller 112. The vehicle 100 may be any of a variety of passenger and/or cargo transporting vehicles, utility vehicles, and the like, each of which are powered by an internal combustion engine (e.g., the engine 102).

The controller 112 includes a processor and non-transient computer-readable media that together provide a circuit configured to perform operations that include sending and receiving signals throughout the vehicle 100. In some arrangements, the controller 112 is communicatively coupled to mechanical devices that can be electrically actuated (e.g., fuel injection systems, exhaust gas recirculation systems, valves, throttles, etc.).

The engine 102 is a source of mechanical force used to drive operations performed by the vehicle 100 (e.g., to rotate one or more wheels for movement, to actuate one or more hydraulic systems, etc.). Common arrangements of the engine 102 consume diesel or unleaded fuel to generate mechanical force while producing heat and an exhaust gas (i.e., including regulated emissions) as a waste product. The engine 102 includes a plurality of cylinders housing a corresponding plurality of reciprocating pistons. Portions of air and fuel are cyclically collected and ignited in each of the plurality of cylinders to drive the movement of the corresponding plurality of pistons. As a result of each ignition cycle, exhaust gas and heat are produced in each of the plurality of cylinders.

Exhaust gas is routed away from the engine 102 by the exhaust system 104. The exhaust system 104 may include a network of conduits, chambers, treatment systems (e.g., exhaust gas aftertreatment system 106, described in more detail below), and the like. In some arrangements, the exhaust system 104 originates at the engine 102 and terminates at a tailpipe portion, at which point a gas flow within exits the exhaust system 104 into the atmosphere.

In some arrangements, the exhaust system 104 includes an exhaust gas recirculation (EGR) system 114. The EGR system 114 is a network of fluid conduits and valves structured to selectively recirculate exhaust gas from the exhaust system 104 back to an intake portion of the engine 102. The engine 102 may then use the recirculated exhaust gas in subsequent ignition cycles. As a result, the ensuing exhaust gas produced is at a higher temperature (i.e., due to high temperature exhaust gas being used in the corresponding ignition cycle).

In addition, in some arrangements, the exhaust system 104 further includes at least one port 110. The port 110 is an aperture that provides an access point to an interior portion of the exhaust system 104. In various arrangements, the port 110 may be structured to accommodate a probe portion of an $O_2$ sensor or a temperature sensor. Alternatively, the port 110 may be structured to accommodate at least a nozzle portion of a reductant injector. In some arrangements, the port 110 is disposed upstream of a selective catalytic reduction (SCR) catalyst 108, such that fluids entering from the port 110 may flow through the SCR 108.

In particular embodiments, the aftertreatment system 106 is integrated into the exhaust system 104 and may include any of several different components to reduce the levels of regulated pollutants present in exhaust gas produced by the engine 102. One such component shown in the example of FIG. 1 is an SCR system including an SCR catalyst 108. Other examples (not shown in FIG. 1) include a diesel oxidation catalyst, a diesel particulate filter, an SCR on filter and/or an ammonia slip catalyst (ASC) (also referred to as an ammonia oxidation catalyst (AMOX)); each of such components are configured to perform a particular exhaust emissions treatment operation on the exhaust gas passing through or over the respective components.

Generally, oxidation catalysts reduce the amount of CO and hydrocarbons present in the exhaust gas via oxidation techniques, as well as convert NO to $NO_2$ for passive regeneration of soot on a particulate filter and to facilitate fast SCR reactions. Particulate filters filter particulate matter, including soot, present in the exhaust gas. An SCR on filter is an assembly that performs the combined functions of an SCR and a particulate filter. SCR catalysts and SCR on filter systems have been developed to remove $NO_x$ from the exhaust gas, which is relatively more difficult to remove than CO, hydrocarbons and particulate matter.

The SCR catalyst 108 is configured to convert $NO_x$ (i.e., NO and $NO_2$ in some fraction) into nitrogen gas (i.e., $N_2$) and water vapor (i.e., $H_2O$). The SCR catalyst 108 may be formed of metal-Zeolite based materials (e.g., Cu-Zeolites, including Si—Al—P—O based materials, Fe-Zeolites, etc.). In operation, a reductant (e.g., typically ammonia ($NH_3$) in some form) is added to the exhaust gas upstream of the SCR catalyst 108. The $NO_x$ and $NH_3$ pass over the SCR catalyst 108 and a catalytic reaction takes place in which $NO_x$ and $NH_3$ are converted into $N_2$ and $H_2O$.

In many conventional SCR catalyst and SCR on filter systems, $NH_3$ is used as a reductant. Typically, pure $NH_3$ is not directly used due to safety concerns, expense, weight, lack of infrastructure, and other factors. Instead, many conventional systems utilize diesel exhaust fluid (DEF), which typically is a urea-water solution. To convert the DEF into $NH_3$, the DEF is injected into a decomposition tube through which an exhaust stream flows. The injected DEF spray is heated by the exhaust gas stream to vaporize the urea-water solution and trigger the decomposition of urea into $NH_3$. The exhaust gas mixture, including the $NH_3$ decomposed from the urea, further mixes while flowing through the decomposition tube and passes over the SCR catalyst 108, where the $NO_x$ and $NH_3$ are converted primarily to $N_2$ and $H_2O$.

Over the course of service, the SCR 108 may eventually inactivate and become significantly less able to convert $NO_x$ under operating temperatures. Potential causes of inactivation include the migration of metal ions to inactive locations in the catalyst, and loss of metal ions altogether (e.g., due to leaching of metal ions).

Figure 2:
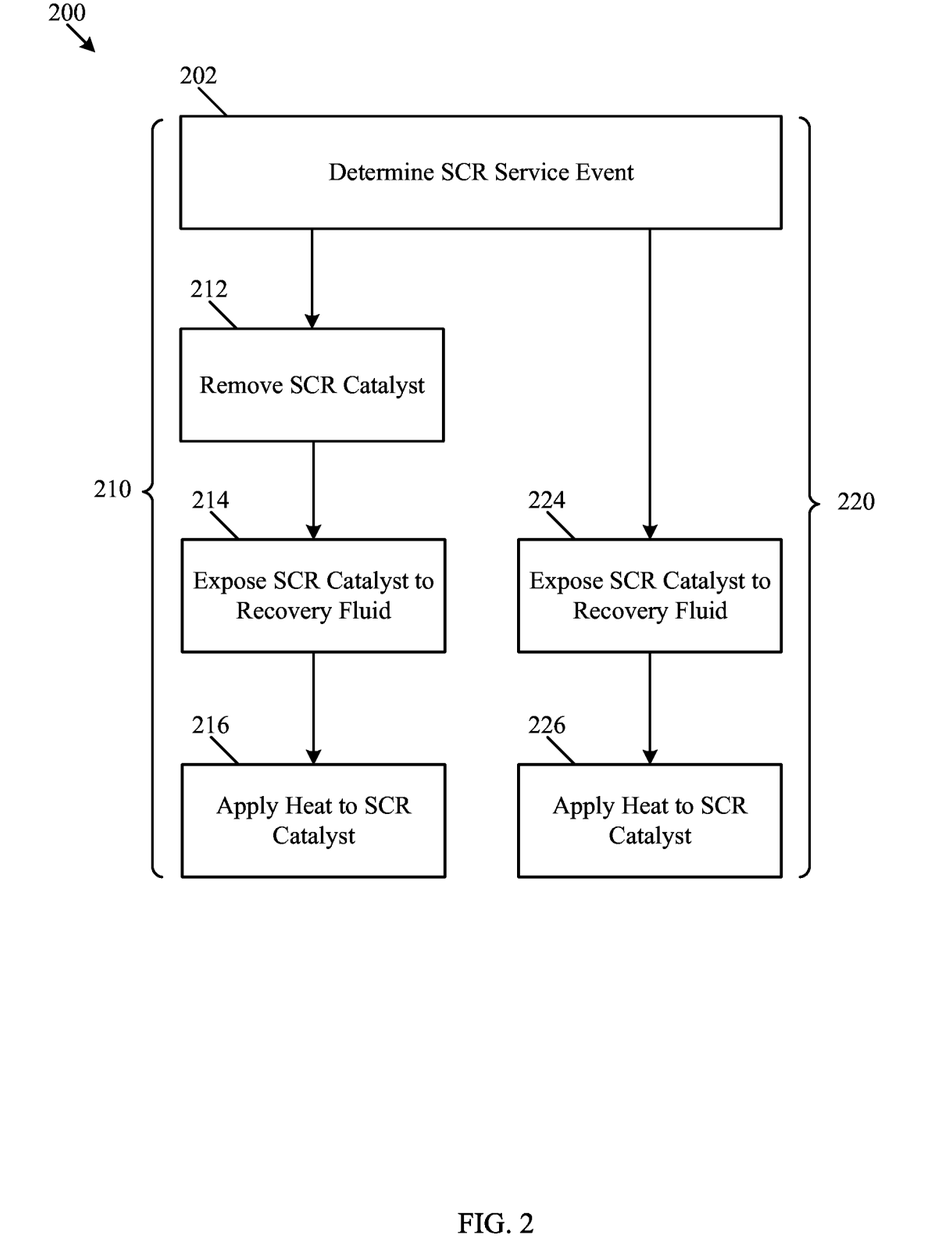
FIG. 2 is a block flow diagram of a method of recovering a deactivated selective catalytic reduction catalyst, according to an example embodiment.

Referring now to FIG. 2, a method 200 of recovering inactivated SCR catalysts (e.g., the SCR catalyst 108) of an exhaust aftertreatment system (e.g., the aftertreatment system 106) disposed on a vehicle (e.g., the vehicle 100) is shown. The method 200 includes a first approach 210 and a second approach 220 of recovering inactivated SCR catalysts, each of which includes determining an SCR service event at 202. The first approach 210 further includes removing the SCR catalyst at 212, exposing the SCR catalyst to recovery fluid at 214, and, in some arrangements, applying heat to the SCR catalyst at 216. As such, in the first approach 210, the inactivated SCR may be recovered off-vehicle (e.g., where the SCR is removed from the vehicle 100 at 212). The second approach 220 includes, following the determining of the SCR service event at 202, exposing the SCR catalyst to recovery fluid, and in some arrangements, applying heat to the SCR catalyst at 226. Thus, in the second approach, an inactivated SCR may be recovered while the SCR is installed on the vehicle.

In various arrangements, the SCR service event may be a proactive measure to prevent the SCR from being deactivated to a point where the aftertreatment system is not capable of converting $NO_x$ and other regulated emissions above minimum levels. For example, the SCR service event may be determined at service intervals based on time (e.g., once a year, once every five years, etc.) or mileage traveled by an associated vehicle (e.g., at a 50,000 mile service, after every 75,000 miles traveled, etc.). In other arrangements, determining the SCR service event at 202 is a reactive event, where significant deactivation of the SCR is detected. For example, exhaust gas may be analyzed during a service event to measure the presence of regulated emissions coming from the exhaust system. If regulated emissions are being produced at impermissible levels (i.e., levels of regulated emissions above a threshold level), an SCR service event may be detected, requiring the remaining steps of the method 200 to be performed. For another example, exhaust gas may be analyzed during vehicle operation, and an emission level of a pollutant greater than a threshold may trigger an indication of a service event needed.

At 212 of the first approach 210, the SCR catalyst is removed from the vehicle. In some arrangements, the SCR catalyst is disposed in a housing defined by a portion of the exhaust system. In some such arrangements, the portion of the exhaust system containing the SCR catalyst may be temporarily decoupled from the vehicle (e.g., by decoupling one or more bolts at corresponding flanges at either end of the portion of the exhaust system). In other such arrangements, the portion of the exhaust system may be cut away from the remainder of the exhaust system. In either case, the core of the SCR catalyst may, in some arrangements, be removed from the housing. In other arrangements, the SCR catalyst core remains within the housing.

At 214 and 224, the SCR catalyst is exposed to recovery fluid. Recovery fluid may be in various forms (e.g., liquid, vapor, gas, or liquid-gas mixtures) and includes a material or materials selected to facilitate a movement of metal ions in the metal-Zeolite catalyst. The exposure at 214 and 224 may vary across embodiments of the method 200, based on various parameters such as recovery fluid type, exposure method, exposure time, exposure temperature, and presence of metal ions in the recovery fluid.

In some arrangements, exposure at 214, 224 involves a recovery fluid comprising an acid (e.g., vinegar, acetic acid, citric acid, oxalic acid, hydrochloric acid, nitric acid, formic acid, sulfuric acid, and others, or a mixture of them). In some such arrangements, the acid is selected to release metal ions from the metal-Zeolite catalyst, facilitating the movement of metal ions from an inactivated position to an activated position (e.g., an acidic solution with a pH of 2.4). In some arrangements, the acid is selected to include metal ions corresponding to the type of metal used in the metal-Zeolite catalyst. For example, where the SCR catalyst includes a Cu-Zeolite catalyst, the recovery fluid may include an aqueous solution of an acid containing copper. Such arrangements may be particularly appropriate where metal has leached from the SCR catalyst over the course of operation, and as such, exposure to the copper acid may replenish copper ions that were lost over the course of service. In other arrangements, the recovery fluid has a relatively neutral (e.g., water) or a basic pH.

Figure 3:
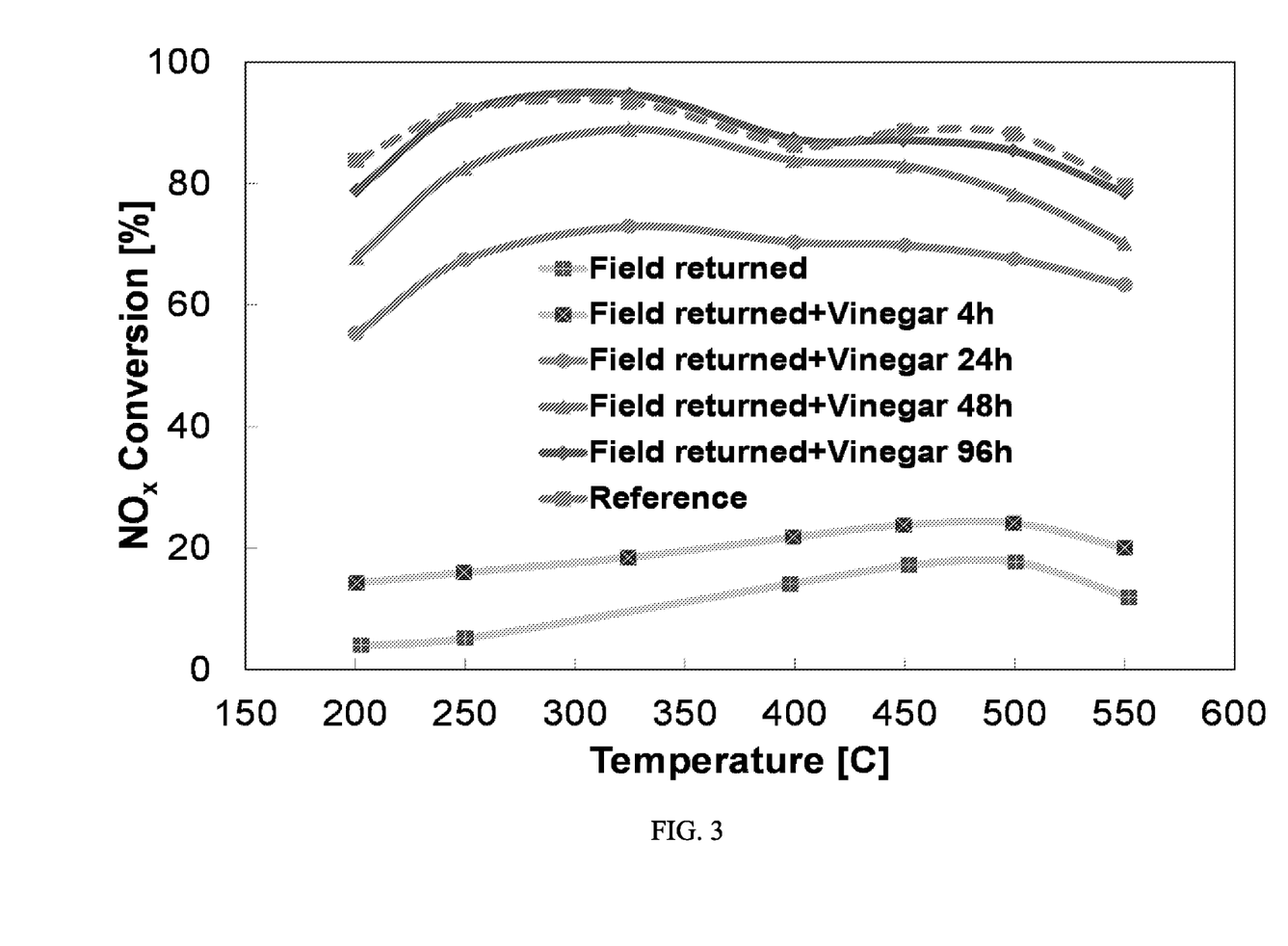
FIG. 3 is a diagram showing progressive catalyst performance recovery by vinegar wicking treatment.

In example arrangements of the exposures at 214 and 224, catalyst cores are exposed to a 5% vinegar solution with a pH of 2.4 for various periods of time. Respective cores are exposed to the vinegar solution via wicking, then the wicked cores (without extra solution in the channels) are sealed in sample bottles and held at room temperature for 4 hours, 24 hours, 48 hours, and 96 hours, respectively and as shown in FIG. 3. FIG. 3 shows improvements to catalyst performances based on $NO_x$ conversion percentages as a function of temperature in ° C. compared to a field returned deactivated catalyst and a reference activated catalyst. As shown in FIG. 3, exposure to vinegar for twenty-four hours yielded the greatest incremental performance improvement out of the experimental set, with exposure for ninety-six hours resulting in catalyst performance that nearly matches the reference catalyst.

Figure 4:
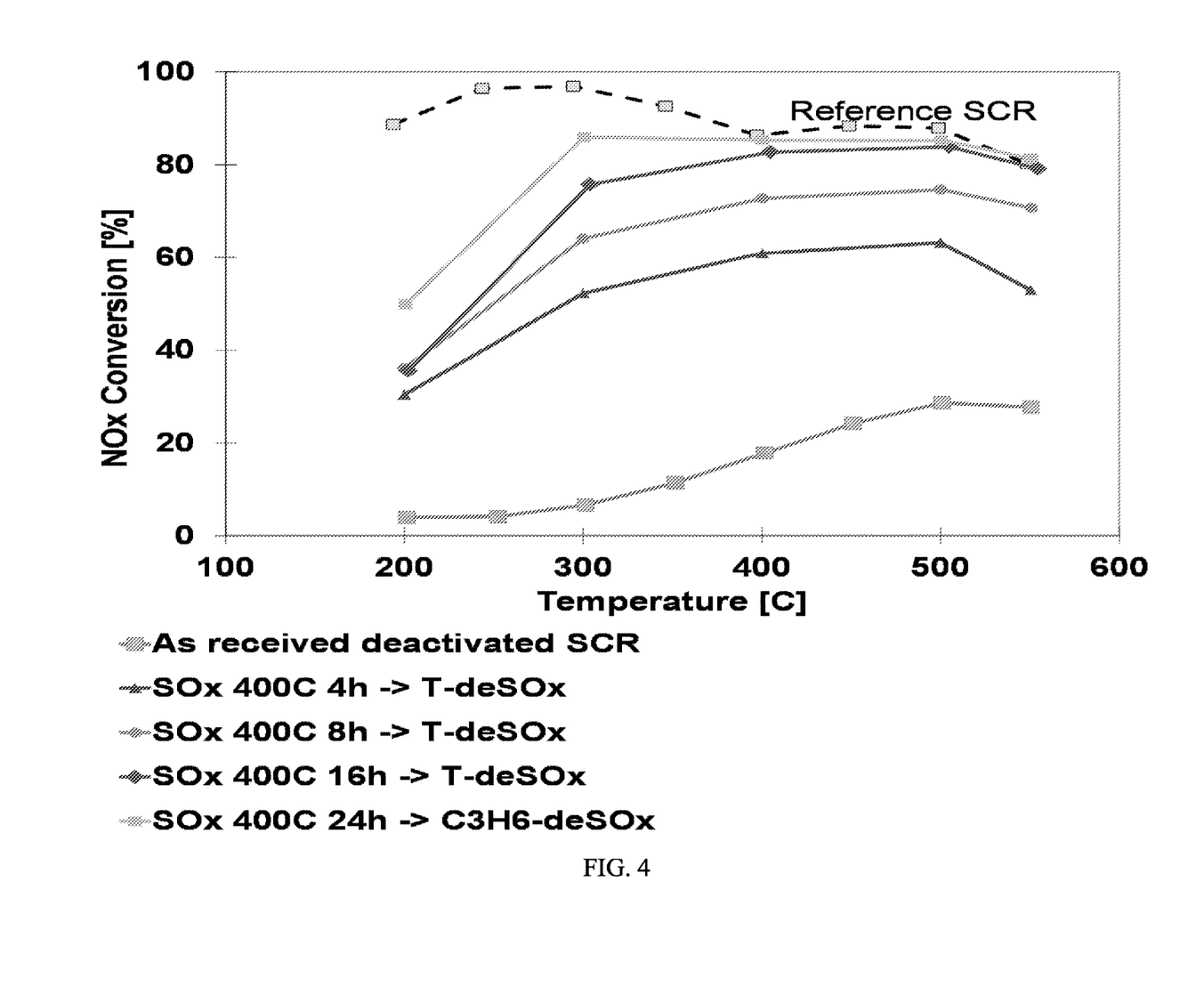
FIG. 4 is a diagram showing progressive catalyst performance recovery by $SO_x$ and de-$SO_x$ treatment.

In some arrangements, the SCR catalyst is exposed at 214, 224 to an acidic recovery fluid that includes sulfur oxides ($SO_x$). In some such arrangements, the SCR catalyst is exposed to $SO_x$ and heat. For example, in one arrangement, the SCR catalyst is exposed to 30 ppm $SO_x$ at 400° C. for a first period time (e.g., 1 hour, 2-4 hours, 12-36 hours). After the SCR catalyst has been exposed to $SO_x$ for the period of time, the SCR catalyst may be exposed to a chemical or thermal de-$SO_x$ process. For example, the SCR catalyst may be exposed to 1,000 ppm $C_3H_6$ de-$SO_x$ at 550° C. for a second period of time (e.g., 12 hours); or the SCR catalyst may be subjected to 550° C. in another de-$SO_x$ process (e.g., in the absence of $C_3H_6$ de-$SO_x$). FIG. 4 shows performance recovery as percentage of $NO_x$ conversion as a function of temperature in C, relative to a reference activated catalyst and a field returned deactivated catalyst. As shown in FIG. 4, exposure to SOx for four hours yielded the greatest incremental improvement out of the experimental set, with almost full catalyst recovery after exposure to SOx for twenty-four hours and $C_3H_6$ de-$SO_x$.

In yet other arrangements, the recovery fluid provides a local atmosphere around the SCR catalyst with a net reducing characteristic. In such arrangements, at 214, 224, the SCR catalyst may be exposed to an environment having a greater proportion of gaseous reducing agents (e.g., $H_2$, CO, hydrocarbons, $NH_3$, etc.) than gaseous oxidizing agents (e.g., $O_2$, NO, $NO_2$, etc.). Consistent across these and other arrangements of the method 200, the SCR catalyst is exposed to a recovery fluid that facilitates the movement of metal ions within the metal-Zeolite core.

Exposing the SCR catalyst to the recovery fluid may be performed in several different ways, based in part on whether the SCR catalyst is removed from the aftertreatment system at 212. In arrangements of the first approach 210 (where the SCR catalyst is removed at 212), a technician may directly access the SCR catalyst core (e.g., within the exhaust housing, or removed from the exhaust housing) to recover the metal-Zeolite catalyst therein. The SCR catalyst may be exposed to the recovery fluid by submerging the SCR catalyst (e.g., within an exhaust housing, or just the core itself) in a basin filled with the recovery fluid. Alternatively, the recovery fluid may be wicked or sprayed onto the SCR catalyst core. In arrangements where the recovery fluid is in a gaseous state, the SCR catalyst may be isolated in an airtight chamber containing the recovery fluid, and/or a flow of gaseous recovery fluid may be passed through the SCR catalyst.

However, in arrangements of the second approach 220, the SCR catalyst remains coupled to the vehicle 100 and may not be as easily accessible for recovery. In some such arrangements, exposing the SCR catalyst to the recovery fluid at 224 may be performed using one or more features of the vehicle, the exhaust system, and/or the aftertreatment system. For example, in one arrangement where the recovery fluid includes $SO_x$, high sulfur diesel may be poured into a fuel system of the vehicle. Over the course of operation, high sulfur diesel is consumed by the engine, and $SO_x$ is released in the exhaust gas. The SCR catalyst is subsequently exposed to $SO_x$ as the exhaust gas passes through the aftertreatment system.

The SCR catalyst may then undergo a corresponding thermal de-$SO_x$ process, for example by subsequently raising the temperature of the exhaust gas. In some arrangements, the temperature of the exhaust gas may be raised via engine management. For example, a controller (e.g., the controller 112) may be configured to add a post-injection of fuel after a main injection of fuel for each combustion cycle in each of the cylinders of the engine, increasing the temperature of the resulting exhaust gas. Alternatively, or in addition, the controller may increase the exhaust gas temperature by increasing the air-to-fuel ratio of the intake system, causing each combustion cycle to result in increased exhaust gas temperatures. In addition, where the vehicle includes an EGR system, the controller may route hot exhaust gas back to the intake system of the engine, increasing the charge temperature and the ensuing exhaust gas temperature. As such, exposure of the SCR catalysts to the recovery fluid may occur while the vehicle 100 continues to operate.

In another arrangement of the second approach 220, the SCR catalyst may be exposed to recovery fluid at 224 via one or more ports (e.g., the port 110) disposed upstream and/or downstream of the SCR catalyst in the exhaust system or via a tailpipe aperture. For example, a sensor or a plug may be removed from the port, exposing an aperture to the interior of the exhaust system. A nozzle may be disposed through the port, and recovery fluid may be injected into the exhaust system. In some arrangements, the recovery fluid may be injected into the exhaust system while the engine is running, and the flow of exhaust gas may carry the recovery fluid to and through the SCR catalyst (e.g., where an upstream port is used). In other arrangements, the engine is off, and recovery fluid may be sprayed onto or towards the SCR catalyst. In yet other arrangements, a nozzle may be inserted into a tailpipe aperture of the exhaust system, and recovery fluid may be sprayed onto or towards the SCR catalyst from a downstream position.

In some arrangements, a net reducing atmosphere is locally created around the SCR catalyst. In some such arrangements, the tailpipe of the exhaust system may be blocked off (e.g., a cap, cover, film, etc., each of which are configured to provide an airtight or near-airtight seal at a tailpipe aperture), and a portion of the exhaust system that is upstream from the SCR catalyst may be blocked off as well (e.g., an expandable balloon disposed through an upstream port). Gaseous reducing agents may then be added to the isolated portion of the exhaust system to create a net-reducing atmosphere around the SCR catalyst. In another such arrangement, a source of gaseous reducing agents (e.g., a reservoir) may be coupled to the tailpipe of the exhaust system (e.g., via a hose), and reducing agents may be pumped into the tailpipe, through the SCR catalyst, and out of the open port.

At 216 and 226, heat may optionally be applied to the SCR catalyst. In some arrangements, heat may be applied to further facilitate the recovery process. For example, as discussed above, heat may be applied along with $SO_x$ and subsequently with de-$SO_x$ to mobilize metal ions. Heat may also be applied to remove recovery fluid from the SCR catalyst. For example, where the recovery fluid includes a weak acid or water in a liquid state, heat may be applied to the SCR catalyst to cause the recovery fluid to transition to a gaseous state for removal.

At 216 of the first approach 210, the SCR catalyst may be placed into a temperature regulated oven, which may be heated incrementally over time (e.g., increasing 1° C. per minute, increasing 5° C. per minute, etc.), and/or may be held at specified temperatures for a period of time (e.g., 500° C. for six hours, 700° C. for two hours, etc.).

At 226 of the second approach 220, heat may be applied via one or more features of the vehicle. As discussed above, the controller may increase the temperature of exhaust gas routed through the exhaust system by adding post-injections of fuel or adjusting the air-to-fuel ratio at the engine. The controller may also cause an EGR system to route hot exhaust gas back to the engine to subsequently produce exhaust gas at a higher temperature.

For the purpose of this disclosure, the term "coupled" means the joining of two members directly or indirectly to one another. Such joining may be stationary or moveable in nature. Such joining may be achieved with the two members, or the two members and any additional intermediate members, being integrally formed as a single unitary body with one another or with the two members, or the two members and any additional intermediate members, being attached to one another. Such joining may be permanent in nature or may be removable or releasable in nature.

It should be noted that the orientation of various elements may differ according to other example embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of recovering inactivated metal-Zeolite based selective catalytic reduction catalysts, comprising:
    determining a selective catalytic reduction catalyst service event where a metal-Zeolite based selective catalytic reduction catalyst of an exhaust aftertreatment system may perform below a threshold level of performance; and
    applying a recovery fluid comprising an acidic fluid to the metal-Zeolite based selective catalytic reduction catalyst so as to facilitate movement of metal ions.

2. The method of claim 1, further comprising heating the metal-Zeolite based selective reduction catalyst.

3. The method of claim 2, wherein heating the metal-Zeolite based selective reduction catalyst includes adding a fuel post-injection to combustion cycles of an associated internal combustion engine.

4. The method of claim 2, wherein heating the metal-Zeolite based selective reduction catalyst includes structuring an exhaust gas recirculation system to recirculate exhaust gas from an associated exhaust system back to an associated internal combustion engine.

5. The method of claim 1, wherein the recovery fluid includes $SO_x$.

6. The method of claim 5, wherein the $SO_x$ is in vapor form.

7. The method of claim 5, wherein the recovery fluid further includes $H_2SO_4$.

8. A method of recovering inactivated metal-Zeolite based selective catalytic reduction catalysts, comprising:
   determining a selective catalytic reduction catalyst service event where a metal-Zeolite based selective catalytic reduction catalyst of an exhaust aftertreatment system may perform below a threshold level of performance; and
   exposing the metal-Zeolite based selective catalytic reduction catalyst to a recovery fluid selected to facilitate movement of metal ions, the recovery fluid comprising $SO_x$;
   wherein exposing the metal-Zeolite based selective catalytic reduction catalyst to the recovery fluid includes adding high sulfur diesel fuel to a fuel reservoir of an associated vehicle, and operating an associated internal combustion engine after adding the high sulfur diesel fuel while the metal-Zeolite based selective catalytic reduction catalyst is coupled to the exhaust aftertreatment system.

9. The method of claim 5, wherein exposing the metal-Zeolite based selective catalytic reduction catalyst to the recovery fluid includes a first exposure to $SO_x$ and a subsequent second exposure to a de-$SO_x$.

10. The method of claim 1, wherein the metal-Zeolite based selective catalytic reduction catalyst service event is determined as a service event due at a defined service interval.

11. The method of claim 1, wherein the metal-Zeolite based selective catalytic reduction catalyst service event is determined by detecting that levels of regulated emissions coming from the aftertreatment system are above a threshold level.

12. The method of claim 1, wherein the method is performed while the metal-Zeolite based selective catalytic reduction catalyst is positioned within the aftertreatment system of a vehicle.

13. The method of claim 1, wherein the method is performed while the metal-Zeolite based selective catalytic reduction catalyst is removed from the aftertreatment system of a vehicle.

14. The method of claim 1, wherein the recovery fluid comprises one of, or a combination of, acetic acid, oxalic acid, hydrochloric acid, citric acid, nitric acid, formic acid, or sulfuric acid.

15. An exhaust aftertreatment system comprising:
   a selective catalytic reduction (SCR) component configured to recover inactivated metal-Zeolite based SCR catalysts by:
      determining a SCR catalyst service event where a metal-Zeolite based SCR catalyst of an exhaust aftertreatment system may perform below a threshold level of performance; and
      applying a recovery fluid comprising an acidic fluid to the metal-Zeolite based SCR catalyst so as to facilitate movement of metal ions.

16. The system of claim 15, wherein the recovery fluid includes $SO_x$.

17. An exhaust aftertreatment system comprising:
   a selective catalytic reduction (SCR) component configured to recover inactivated metal-Zeolite based SCR catalysts by:
      determining a SCR catalyst service event where a metal-Zeolite based SCR catalyst of an exhaust aftertreatment system may perform below a threshold level of performance; and
      exposing the metal-Zeolite based SCR catalyst to a recovery fluid selected to facilitate movement of metal ions, the recovery fluid comprising $SO_x$;
   wherein exposing the metal-Zeolite based SCR catalyst to the recovery fluid includes adding high sulfur diesel fuel to a fuel reservoir of an associated vehicle, and operating an associated internal combustion engine after adding the high sulfur diesel fuel while the metal-Zeolite based SCR catalyst is coupled to the exhaust aftertreatment system.

18. The system of claim 16, wherein exposing the metal-Zeolite based SCR catalyst to the recover fluid includes a first exposure to $SO_x$ and a subsequent second exposure to a de-$SO_x$.

19. The system of claim 15, wherein the recovery fluid comprises at least one of, acetic acid, oxalic acid, hydrochloric acid, citric acid, nitric acid, formic acid, or sulfuric acid.

* * * * *